Dec. 20, 1927.

H. N. ATWOOD

VEHICLE WHEEL

Filed Aug. 23, 1923

Inventor

Harry N. Atwood.

By

Lacey & Lacey, Attorneys

Dec. 20, 1927.

H. N. ATWOOD 1,653,331

VEHICLE WHEEL

Filed Aug. 23, 1923

Inventor

Harry N. Atwood.

By Lacey & Lacey, Attorneys

Patented Dec. 20, 1927.

UNITED STATES PATENT OFFICE.

HARRY N. ATWOOD, OF MONSON, MASSACHUSETTS.

VEHICLE WHEEL.

Application filed August 23, 1923. Serial No. 658,942.

This invention relates to an improvement in composite vehicle wheels and more particularly to a wheel designed for use upon trucks and other heavy types of automobiles.

It is a reconized fact that the ordinary truck wheel presents disadvantages due to its rigidity, weight, and cumbersome construction. Because of the rigidity of such a wheel, the parts of the automobile are subjected to severe vibrations and shocks, the force of which is, if anything, increased because of the heavy and cumbersome nature of the structure. Therefore, it is the primary object of the present invention to provide a truck wheel which will be relatively light in weight, will possess a maximum degree of strength and durability, and will yet be yieldable or resilient to a desirable degree so as to provide for the absorption of shocks and vibrations and prevent their transmission to the bearings or other parts of the automobile with the usual force.

Another object of the invention is to provide a truck wheel of composite structure possessing properties rendering it exceptionally durable, shock absorbing, proof against warping or other distortion through impacts or the absorption of moisture, and yieldable or resilient to a degree to supplement the cushioning qualities of the solid rubber tire associated therewith.

Another important object of the invention is to provide a truck wheel with a rim of novel construction and form and embodying a tire which constitutes an integral part therewith.

Figure 1:
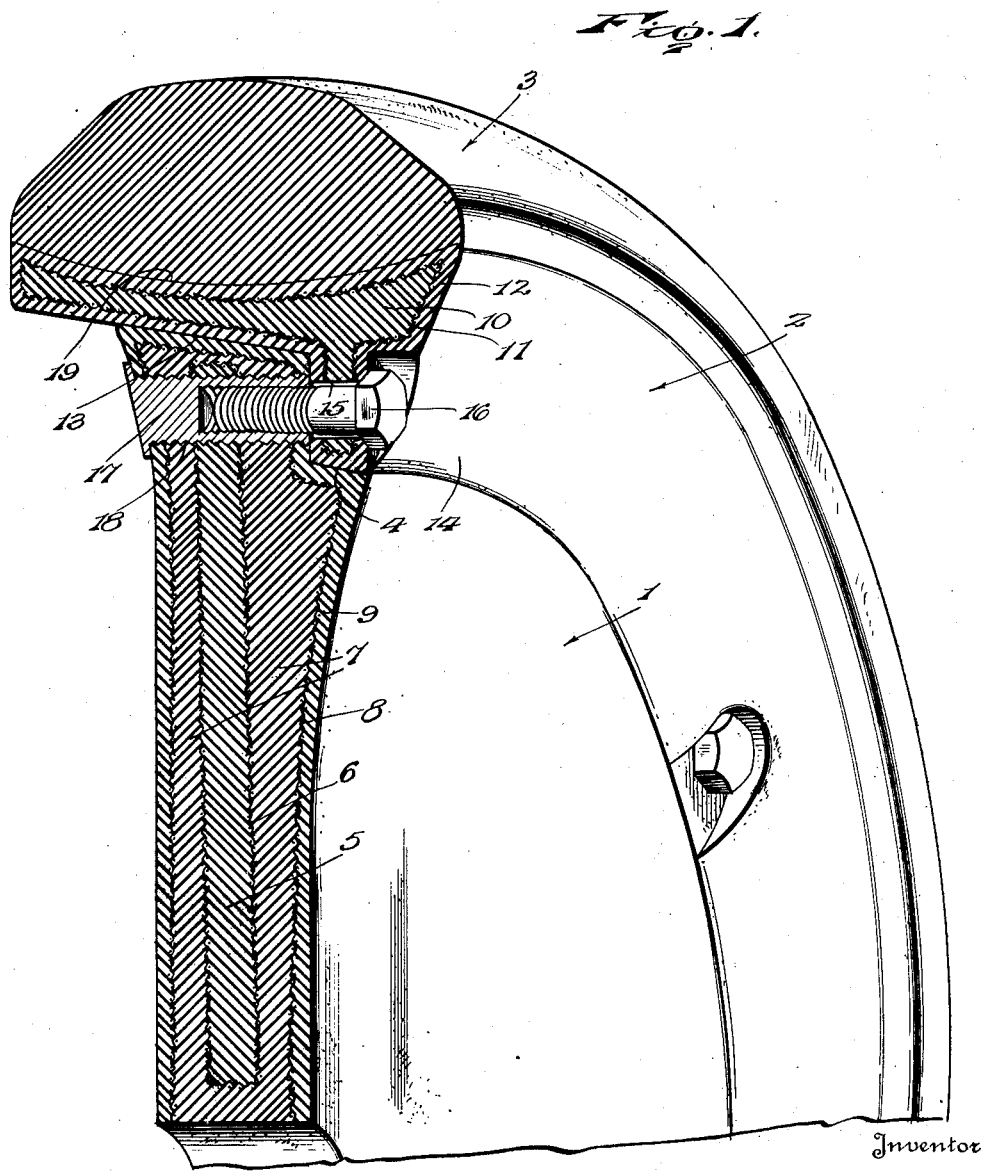
Figure 1 is a sectional perspective view illustrating a truck wheel constructed in accordance with the invention.

The wheel illustrated in the drawings is designed primarily for employment upon trucks and the other heavy types of automobiles and comprises a body indicated in general by the numeral 1, a rim which is indicated in general by the numeral 2, and a tire indicated by the numeral 3.

The wheel body 1 is of circular form and may have its faces of any desired contour, and the body will be equipped with the usual spindle bearings (not shown) fitted and secured thereto in any approved manner. The body 1 is provided at its peripheral portion with a circumscribing rabbet 4 to accommodate a portion of the rim or felly 2 as will presently be explained, and the body is made up preferably in the following manner. An annular substantially flat sided core 5 of soft rubber is first prepared, and after it is formed it is enveloped in a reinforcing covering 6 of woven wire mesh material, this covering extending entirely about and completely enclosing the core and being preferably formed by weaving the wire, in a machine provided for that purpose, directly about the core. A layer 7 of soft rubber is then built up about the enclosed core, and the assemblage thus obtained is enveloped in a woven wire mesh covering 8 which is applied in the wire weaving machine referred to above and in substantially the same manner as in the formation of the reinforcing cover 6. The assemblage is then provided with a covering layer 9 of soft rubber, and the whole is then placed in a suitable mold and subjected to vulcanization. The vulcanization treatment may be carried on for a shorter or longer period of time as may be found expedient and depending upon the hardness or toughness which it is desired the rubber content of the body shall possess. At this point it will be evident that in the step of vulcanization the rubber will become intimately incorporated with the woven wire mesh reinforcements 6 and 8, these members serving to reinforce the wheel body and impart the desired degree of stiffness thereto without, however, in any way impairing the elasticity of the rubber of the body or its shock absorbing and cushioning qualities. Furthermore, while the reinforcements 6 and 8 are intimately incorporated in the rubber body of the wheel and cannot become stretched or similarly distorted, nevertheless the meshes of these members may yield sufficiently to enable the rubber body of the wheel to efficiently perform its cushioning and shock absorbing functions. It will also be evident that the reinforcements 6 and 8 are completely embedded in the rubber of the wheel body so that while these members are of woven metallic mesh material, nevertheless they will be protected from moisture and cannot become rusted or corroded.

The rim 2 is formed by first molding to the required shape, out of soft rubber, a core indicated by the numeral 10, weaving thereover, as in the manner previously explained, an enveloping reinforcing member 11, and finally applying a cover 12 of rubber over the assemblage and vulcanizing the whole. The periphery of the wheel body is beveled as indicated by the numeral 13, and the rim 2 is interiorly of conical form so as to adapt the rim to be fitted snugly onto the body, the rim being provided at one side with an inwardly projecting circumferential flange 14 which seats within the rabbet 4.

In order to secure the rim in place upon the wheel body, the flange 14 is formed at suitable intervals with openings 15, and bolts 16 are fitted through the openings and are threaded into thimbles 17 which are in turn threaded or otherwise held in openings 18 formed in the peripheral portion of the body of the wheel.

The tire seating surface of the rim 2 is indicated by the numeral 19 and the same is transversely concave. The tire 3 is provided by applying a mass of uncured rubber about the rim 2 on the seating surface 19 thereof, and curing this mass at the time the rim is subjected to the vulcanizing process previously referred to. Thus the tire or tread becomes an integral part with the rim. When the tread or tire 3 becomes worn away it, together with the rim, may be removed from the wheel body by first removing the bolts 16, and may be entirely discarded or the rim may be retreaded.

Figure 2:
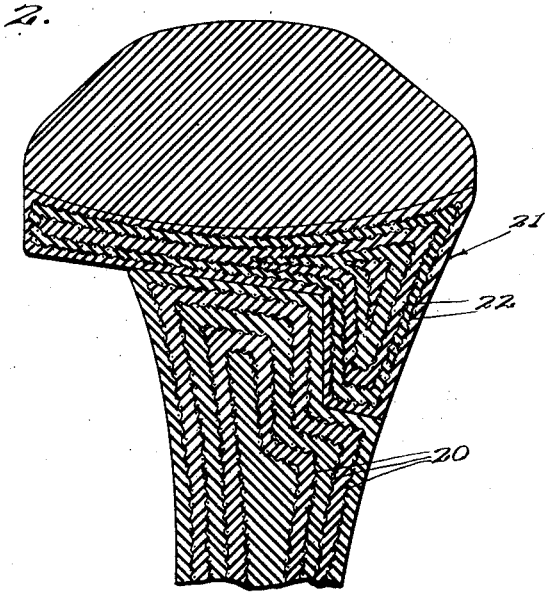
Figure 2 is a detail transverse sectional view illustrating a modification of the invention.
Figure 3:
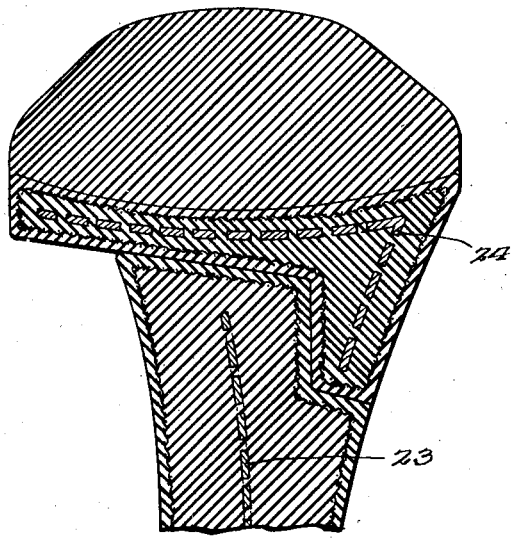
Figure 3 is a similar view illustrating a further modification.

In the form of the invention above described and illustrated more particularly in Figure 1 of the drawings, the body of the wheel is reinforced by two woven wire reinforcements 6 and 8, and the rim is similarly reinforced by a single reinforcement 11. In the embodiment illustrated in Figure 2, however, the numeral 20 indicates more than two woven wire reinforcements which are embedded in the rubber of the wheel body, and likewise, in this embodiment, the rim which is indicated by the numeral 21, is reinforced by more than two woven wire reinforcements 22 embedded therein. In this modified structure, the wheel parts are of course, built up in precisely the same way as described in connection with the form shown in Figure 1, the only difference being that a relatively large number of reinforcing members is woven into the respective wheel parts. Under some conditions it may be desirable to more solidly reinforce the wheel body or the rim to stiffen these parts and render them less yieldable, and where this is desired, reinforcing members 23 and 24 will be embedded in the body and rim respectively. These reinforcing members may be formed in any desired manner, as, for example, from expanded sheet metal or from perforated or foraminous sheet metal and will conform generally to the contour of the wheel body or rim of which they constitute a part, the said reinforcing members being embedded in the particular wheel part at the center thereof. The reinforcing members 23 and 24 may be stamped, pressed, or formed in any other manner to reduce them to the proper form.

Having thus described the invention, what is claimed as new is:

1. In a vehicle wheel, a distinct rim of rubber, and a cushioning tread of rubber surrounding the same and vulcanized thereto.

2. In a combined rim and tire, a body consisting of a rubber core of the same general contour as the rim, a reinforcement enclosing the core, an outer layer of rubber enclosing the core and reinforcement, and a tire forming tread of rubber surrounding the tread portion of the body, all of said rubber portions being bonded into intimate engagement with each other by vulcanizing.

In testimony whereof I affix my signature.

HARRY N. ATWOOD. [L. S.]